United States Patent
Murgatroyd et al.

(10) Patent No.: US 10,450,463 B2
(45) Date of Patent: Oct. 22, 2019

(54) MIXTURES OF FIBRE-REACTIVE DYES

(71) Applicant: DyStar Colours Distribution GmbH, Raunheim (DE)

(72) Inventors: Adrian Murgatroyd, Frankfurt am Main (DE); Ulrich Hanxleden, Kelkheim (DE); Manfred Hoppe, Kürten (DE); Clemens Grund, Hattersheim (DE); Michael Sting-Rosen, Hürth (DE)

(73) Assignee: DyStar Colours Distribution GmbH (DE)

(*) Notice: Subject to any disclaimer, the term of this patent is extended or adjusted under 35 U.S.C. 154(b) by 0 days.

(21) Appl. No.: 16/064,239

(22) PCT Filed: Sep. 12, 2016

(86) PCT No.: PCT/EP2016/071390
§ 371 (c)(1),
(2) Date: Jun. 20, 2018

(87) PCT Pub. No.: WO2017/050597
PCT Pub. Date: Mar. 30, 2017

(65) Prior Publication Data
US 2019/0002701 A1 Jan. 3, 2019

(30) Foreign Application Priority Data

Sep. 22, 2015 (EP) .................................. 15186219

(51) Int. Cl.
| | | |
|---|---|---|
| *C09B 67/00* | (2006.01) | |
| *C09D 11/328* | (2014.01) | |
| *D06P 3/66* | (2006.01) | |
| *D06P 5/30* | (2006.01) | |
| *D06P 1/10* | (2006.01) | |
| *D06P 1/384* | (2006.01) | |
| *D06P 1/38* | (2006.01) | |
| *C09B 67/22* | (2006.01) | |

(52) U.S. Cl.
CPC ........ *C09B 67/0059* (2013.01); *C09D 11/328* (2013.01); *D06P 1/10* (2013.01); *D06P 1/38* (2013.01); *D06P 1/384* (2013.01); *D06P 3/66* (2013.01); *D06P 3/666* (2013.01); *D06P 5/30* (2013.01)

(58) Field of Classification Search
CPC ..... C09B 67/0059; C09D 11/328; D06P 5/30; D06P 1/384; D06P 3/666; D06P 1/10; D06P 1/38; D06P 3/66
See application file for complete search history.

(56) References Cited

U.S. PATENT DOCUMENTS

| | | | |
|---|---|---|---|
| 7,455,699 B2 | 11/2008 | Eichhorn et al. | |
| 2009/0178213 A1* | 7/2009 | Tzikas | ................ C09B 67/0042 8/499 |

FOREIGN PATENT DOCUMENTS

| | | |
|---|---|---|
| CA | 2142742 A1 | 8/1995 |
| DE | 19540544 A1 | 5/1997 |
| EP | 0668328 A2 | 8/1995 |
| EP | 1490441 A1 | 12/2004 |
| JP | S4736838 B1 | 9/1972 |
| JP | 2010107572 A | 5/2010 |
| WO | WO-03080739 A1 | 10/2003 |
| WO | WO-2004088031 A2 | 10/2004 |
| WO | WO-2007003541 A2 | 1/2007 |
| WO | WO-2010050495 A1 | 5/2010 |
| WO | WO 2010/086243 * | 8/2010 |
| WO | WO-2010086243 A2 | 8/2010 |
| WO | WO-2014063822 A1 | 5/2014 |

OTHER PUBLICATIONS

International Preliminary Report on Patentability for PCT/EP2016/071390 dated Mar. 27, 2018.
International Search Report for PCT/EP2016/071390 dated Nov. 18, 2016.
Written Opinion of the International Searching Authority for PCT/EP2016/071390 dated Nov. 18, 2016.

\* cited by examiner

*Primary Examiner* — Amina S Khan
(74) *Attorney, Agent, or Firm* — Drinker Biddle & Reath LLP

(57) ABSTRACT

Mixtures of fiber reactive dyes and their use of for the dyeing of hydroxyl- and carboxamide-containing material in blue and navy shades are described.

2 Claims, No Drawings

MIXTURES OF FIBRE-REACTIVE DYES

CROSS-REFERENCE TO RELATED APPLICATIONS

This application is a national stage application (under 35 U.S.C. § 371) of PCT/EP2016/071390, filed Sep. 12, 2016, which claims benefit of European Application No. 15186219.0, filed Sep. 22, 2015, both of which are incorporated herein by reference in their entirety.

The present invention relates to mixtures of fiber reactive copper-complex azo dyes with other fiber reactive azo dyes and their use of for the dyeing of hydroxyl- and carboxamide-containing material in blue and navy shades.

Fiber-reactive copper-complex azo dyes are of interest due to their potential to produce blue to violet dyeings of high fastness to light. However, they often possess certain performance limitations, such as deficient build-up of colour to deeper shades, unlevel dyeing, a colour yield, which is too heavily dependent on variations in dyeing parameters, and low resistance to oxidative agents.

These performance defects can partly be overcome in some cases by the use of mixtures of fiber reactive copper complex azo dyes with selected other fiber reactive azo dyes. Such mixtures make it possible, for example, to achieve neutral to greenish Navy shades with high light and perspiration-light fastness, very good resistance to washing in the presence of modern oxidative detergents, and good colour constancy in different light sources. The use of such mixtures can give dyeings with superior fastness properties to existing mono-molecular fiber-reactive Navy dyes.

Additionally many existing commercial Navy and Black products include dyes, which, due to their chemistry, are causing problems of contamination with regulatory-controlled amines. C.I. Reactive Black 5 in particular is used quite often for commercial reasons—although it is known to involve a risk of p-chloroaniline contamination in the parabase ester intermediate used in its production. Alternative procedures for the production of parabase ester with low p-chloroaniline content are known (as described for example in German Patent DE 19 540 544) but have not been adopted as they are also not completely free of p-chloroaniline and involve higher cost.

Because the compliance with ecological and toxicological standards is of increasing importance to retailers and consumers, there is a growing need for dyes, which due to their chemistry avoid common sources of contamination with regulatory-controlled amines—and the present invention bases on such dyes.

Due to developing consumer requirements there is still a need for new dyestuffs with good build-up and levelness, high light- and oxidative fastness and good colour constancy, which additionally comply with toxicological and ecological standards. Surprisingly it now was found, that there exist combinations of dyes, which can be produced without the risk of contamination with restricted substances, which combinations have the required properties. Thus, the present invention provides dye mixtures, which possess these properties to a high degree and at the same time avoid contamination with restricted substances.

The present invention is directed to mixtures of fibre-reactive dyes comprising: a dye of formula (I)

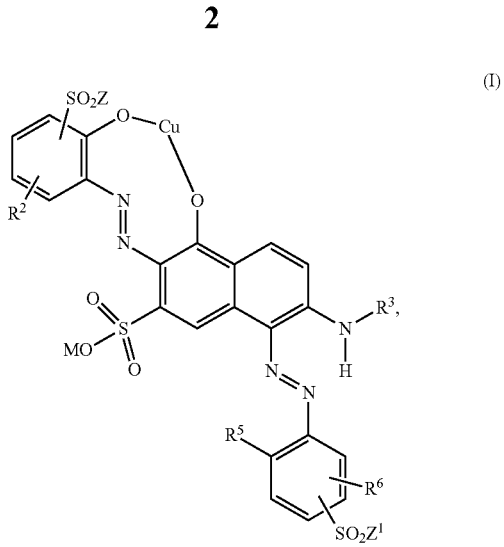

a dye of formula (II)

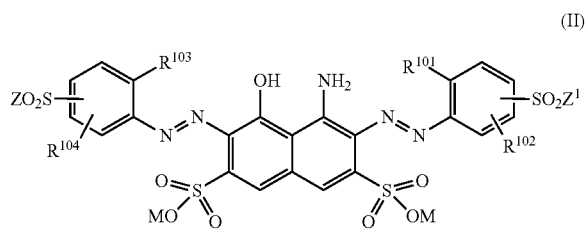

and optionally a dye of formula (III)

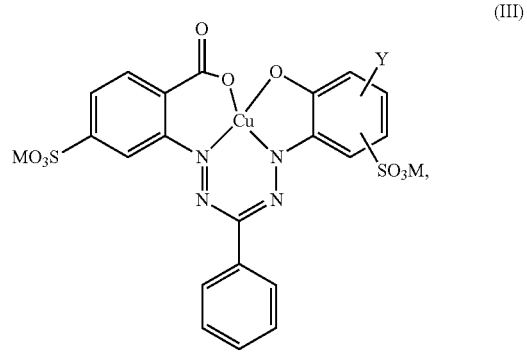

wherein independently of each other
$R^2$ is hydrogen, $(C_1-C_4)$-alkyl, $(C_1-C_4)$-alkoxy, hydroxyl, sulfo, carboxyl, amido, ureido or halogen,
$R^3$ is $(C_1-C_4)$-alkyl; $(C_1-C_4)$-alkyl substituted by sulfo, carboxyl, halogen, hydroxyl, amino or acetamido; phenyl; or phenyl substituted by $(C_1-C_4)$-alkyl, $(C_1-C_4)$-alkoxy, sulfo, halogen, carboxyl, acetamido or ureido;
$R^5$ is $(C_1-C_4)$-alkyl, $(C_1-C_4)$-alkoxy, hydroxyl, sulfo, carboxyl, amido, ureido or halogen,
$R^6$ is hydrogen, $(C_1-C_4)$-alkyl, $(C_1-C_4)$-alkoxy, hydroxyl, sulfo, carboxyl, amido, ureido or halogen,
$R^{101}$ and $R^{103}$ are $C_1-C_4$-alkyl, $C_1-C_4$-alkoxy, sulfo or carboxyl,
$R^{102}$ and $R^{104}$ are hydrogen, $C_1-C_4$-alkyl, $C_1-C_4$-alkoxy, sulfo, carboxyl, Z and $Z^1$ are —CH=$CH_2$, —$CH_2CH_2$G or hydroxyl,
G is hydroxyl or an alkali-detachable group,
Y is —$SO_2$—Z or a group of the formula (100)

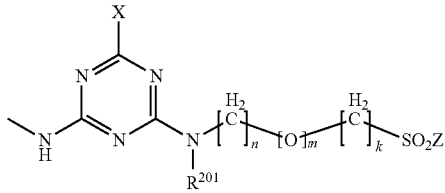

(100)

wherein
X is halogen,
$R^{201}$ is hydrogen ($C_1$-$C_4$)-alkyl or phenyl,
n is 2 or 3,
m is 0 or 1,
k is 0 to 3
and
M is hydrogen, an alkali metal or one equivalent of an alkaline earth metal.

($C_1$-$C_4$)-alkyl groups may be straight-chain or branched and may be methyl, ethyl, n-propyl, isopropyl, n-butyl, isobutyl, sec-butyl or tert-butyl. Preferred are ($C_1$-$C_3$)-alkyl groups. More preferred are ($C_1$-$C_2$)-alkyl groups—methyl and ethyl and ethyl being the most preferred alkyl groups.

The same selection as for the alkyl groups applies to alkoxy, sulfoalkyl and alkylene groups.

M is preferably hydrogen, lithium, sodium or potassium, more preferably hydrogen or sodium.

Non-limiting examples of alkali-detachable groups as represented by G are halogen, preferably chlorine and bromine, ester groups of organic carboxylic and sulfonic acids, such as alkylcarboxylic acids, unsubstituted or substituted benzenecarboxylic acids, and unsubstituted or substituted benzenesulfonic acids, such as the groups ($C_2$-$C_5$)-alkanoyloxy, including more particularly acetyloxy, benzoyloxy, sulfobenzoyloxy, phenylsulfonyloxy, and tolylsulfonyloxy; acidic ester groups of inorganic acids, such as of phosphoric acid, sulfuric acid, and thiosulfuric acid (phosphato, sulfato, and thiosulfato groups), or di-($C_1$-$C_4$)-alkylamino groups, such as dimethylamino and diethylamino.

Z, $Z^1$ are preferably vinyl, R-sulfatoethyl or R-chloroethyl and more preferably β-sulfatoethyl or vinyl.

The groups "sulfo", "carboxyl", "thiosulfato", "phosphato", and "sulfato" include not only their acid form but also their salt form. Accordingly, sulfo groups have the formula —$SO_3M$, thiosulfato groups have the formula —S—$SO_3M$, carboxyl groups have the formula —COOM, phosphato groups have the formula —$OPO_3M_2$, and sulfato groups have the formula —$OSO_3M$, in each of which M is defined as indicated above.

Preferred are dye mixtures with a weight ratio of (I) 20 to 80%, (II) 80 to 20% adding up to 100%. More preferred are mixtures, which comprise a dye of formula (III). They preferably have a weight ratio of (I) 20 to 60%, (II) 50 to 20% and (III) 30 to 20% adding up to 100%. All percentages are based on the dye.

More preferred are mixtures of fibre-reactive dyes comprising:
dyes of the formula (I), (II) and optionally dyes of the formula (III) as described above,
wherein independent of each other
$R^2$ is hydrogen, ($C_1$-$C_2$)-alkyl, ($C_1$-$C_2$)-alkoxy or sulfo,
$R^3$ is ($C_1$-$C_2$)-alkyl or ($C_1$-$C_2$)-alkyl substituted by sulfo,
$R^5$ is ($C_1$-$C_2$)-alkyl, ($C_1$-$C_2$)-alkoxy or sulfo,
$R^6$ is hydrogen, ($C_1$-$C_2$)-alkyl, ($C_1$-$C_2$)-alkoxy or sulfo,
$R^{101}$ and $R^{103}$ are $C_1$-$C_2$-alkyl, $C_1$-$C_2$-alkoxy, sulfo or carboxyl,
$R^{102}$ and $R^{104}$ are hydrogen, $C_1$-$C_2$-alkyl, $C_1$-$C_2$-alkoxy, sulfo or carboxyl,
Z and $Z^1$ are —CH=$CH_2$, —$CH_2CH_2$G or hydroxyl,
G is hydroxyl or an alkali-detachable group,
Y is —$SO_2$—Z or a group of formula (100)

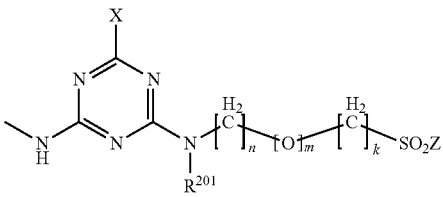

(100)

wherein
X is Cl or F,
$R^{201}$ is hydrogen, ($C_1$-$C_2$)-alkyl or phenyl,
n is 2 or 3,
m is 0 or 1,
k is 0 to 3
and
M is hydrogen, Na, K or Li.

Even more preferred are mixtures of fibre-reactive dyes comprising:
dyes of formula (I), (II) and optionally dyes of formula (III) as described above,
wherein independent of each other
$R^2$ is hydrogen, methy, methoxy or sulfo,
$R^3$ is methyl or ($C_1$-$C_2$)-alkyl substituted by sulfo,
$R^5$ is methy, methoxy or sulfo,
$R^6$ is hydrogen, methy, methoxy or sulfo,
$R^{101}$ and $R^{103}$ are, methy, methoxy or sulfo,
$R^{102}$ and $R^{104}$ are hydrogen, methy, methoxy or sulfo,
Z and $Z^1$ are —CH=$CH_2$, —$CH_2CH_2$G or hydroxyl,
G is hydroxyl or an alkali-detachable group,
Y is —$SO_2$—Z or a group of formula (100)

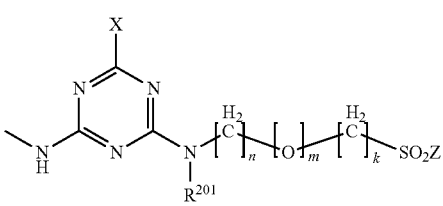

(100)

wherein
X is Cl or F,
$R^{201}$ is hydrogen, methyl or phenyl,
n is 2 or 3,
m is 0 or 1,
k is 0 to 3,
and
M is hydrogen, Na, K or Li.

Particularly preferred are mixtures, wherein the dye of general structure (I) is selected from the group consisting of:

I-1
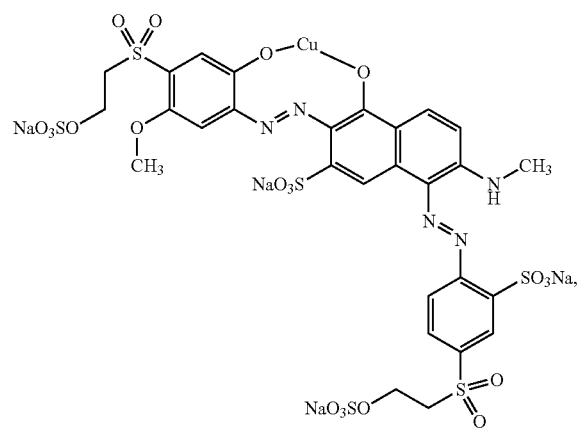
I-2
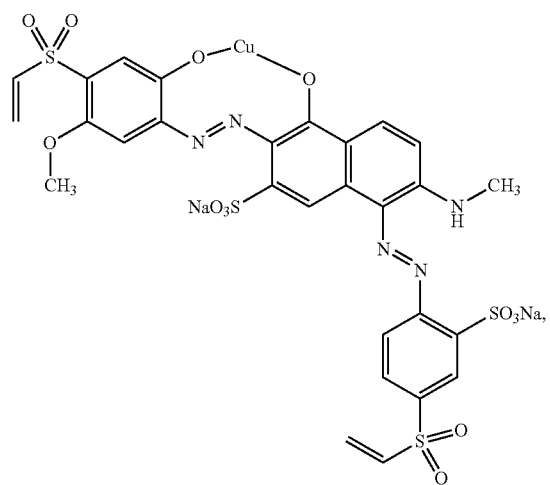
I-3
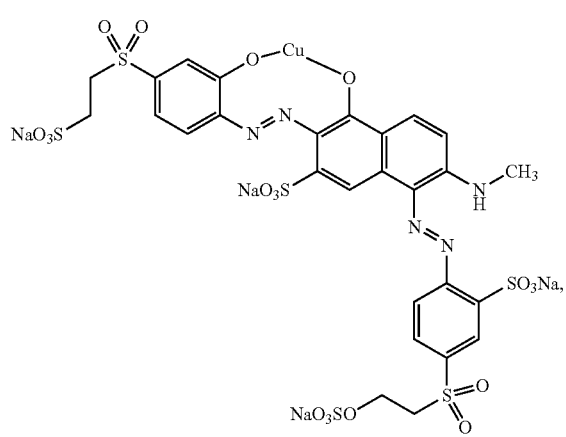
I-4
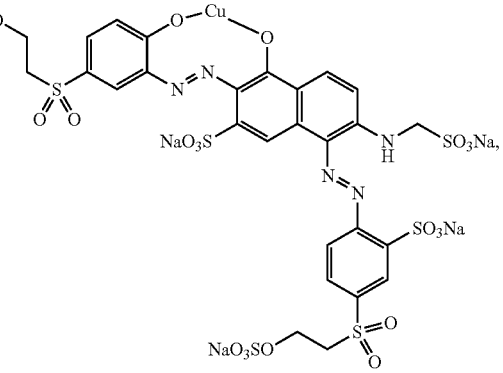
I-5
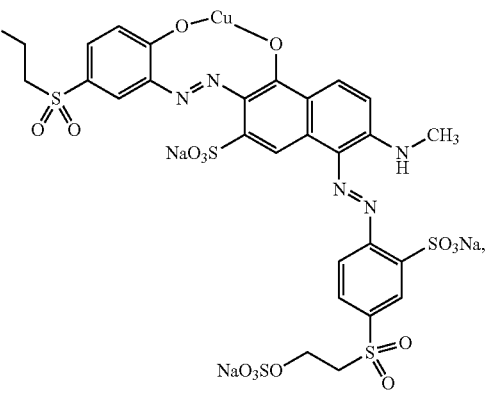
I-6
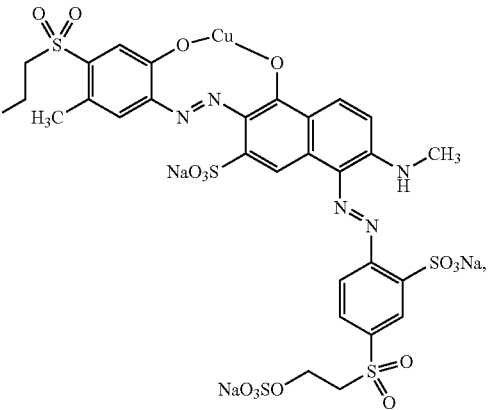
I-7
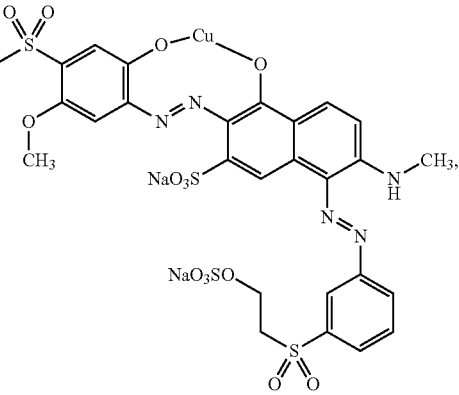

I-8
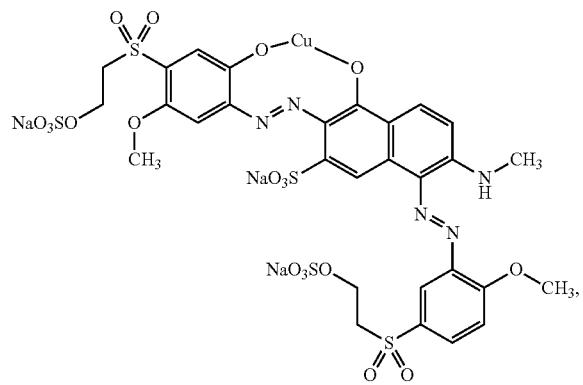
I-9
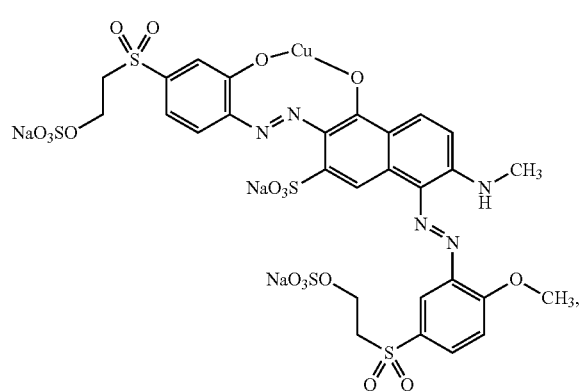
I-10
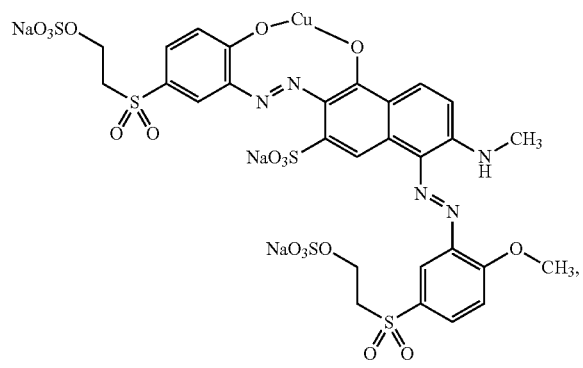
I-11
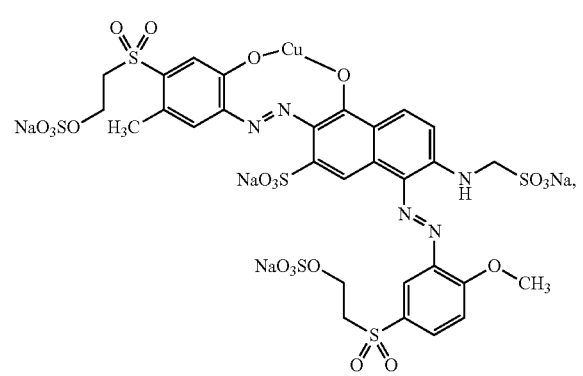
I-12
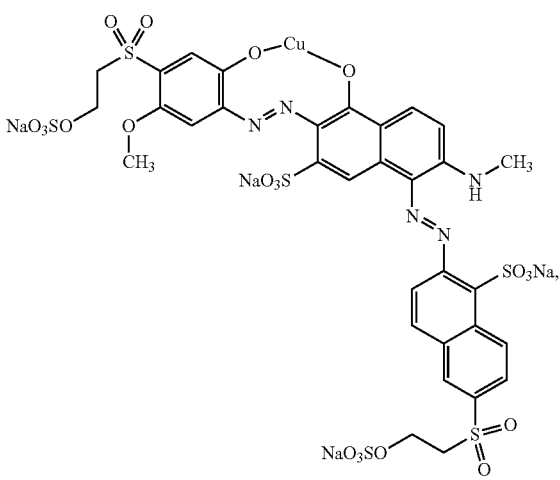
I-13
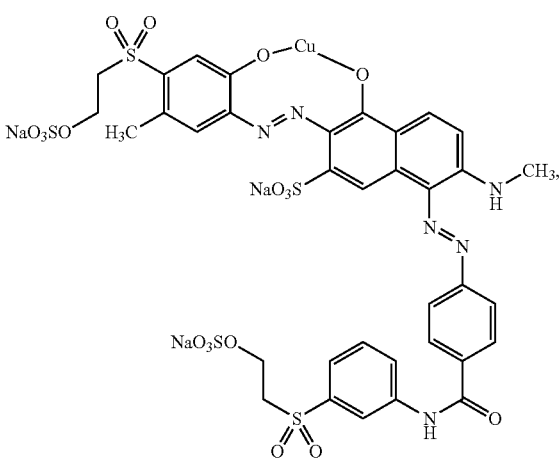
I-14
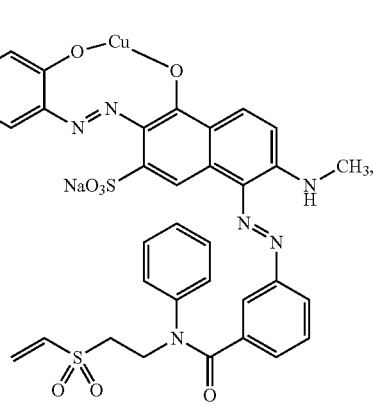

I-15
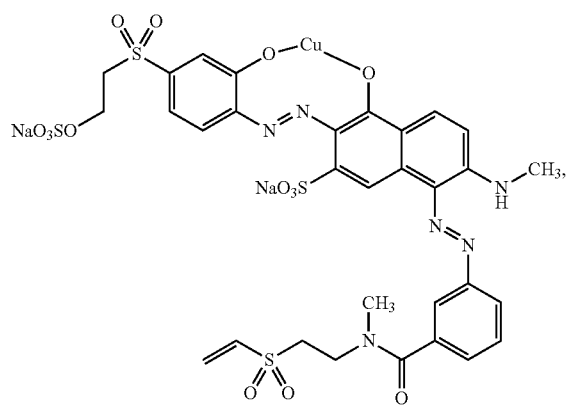
I-16
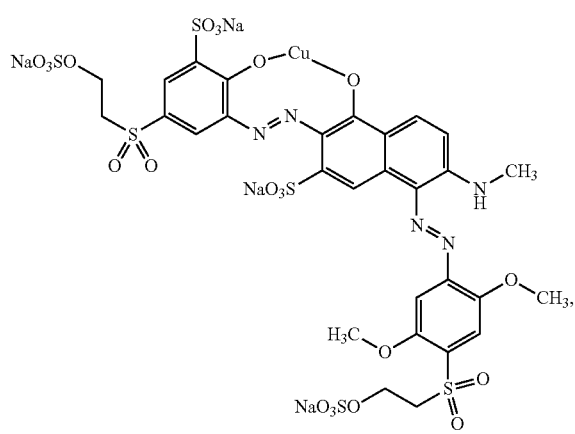
I-17
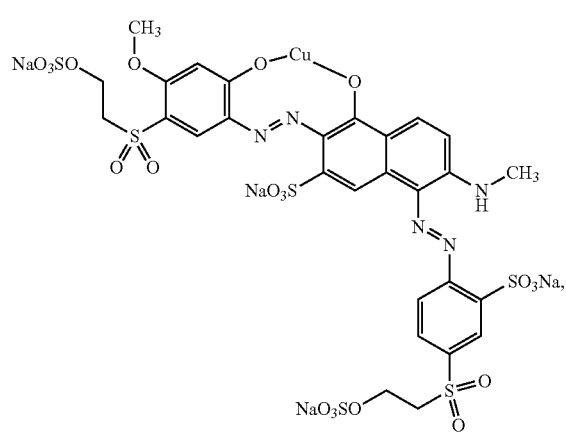
I-18
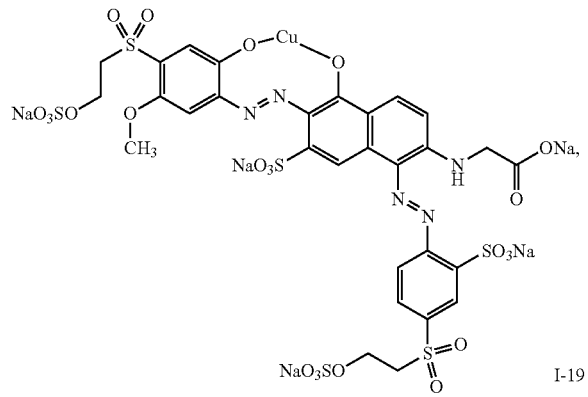
I-19
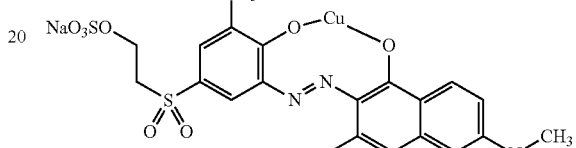
I-20
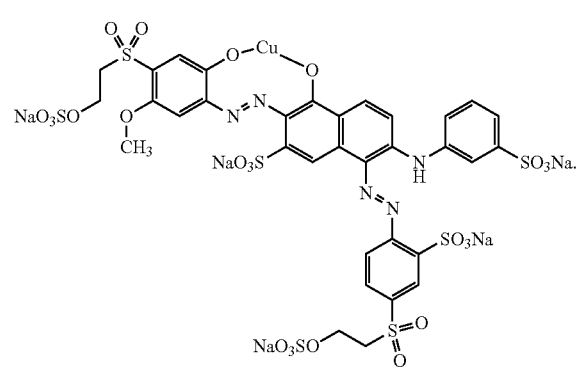
and
I-21
Even more preferred are mixtures, wherein the dye of general structure (I) is selected from the group consisting of: I-1, I-2, I-3, I-4, I-5, I-6, I-12, I-13, I-17, I-18, I-20 and I-21.

Most preferred are mixtures, wherein the dye of general structure (I) is selected from the group consisting of: I-1, I-2 and I-4,
Particularly preferred are mixtures, wherein the dye of general structure (II) is selected from the group consisting of:
II-1
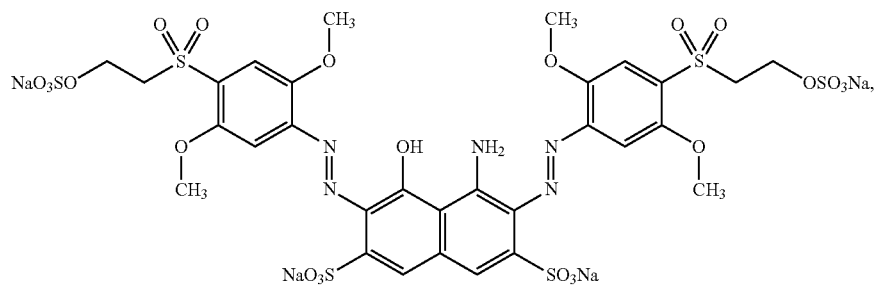
II-2
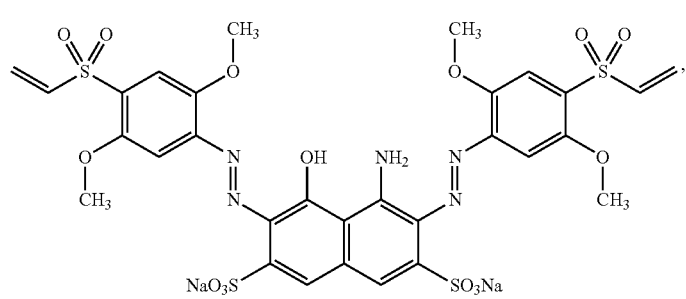
II-3
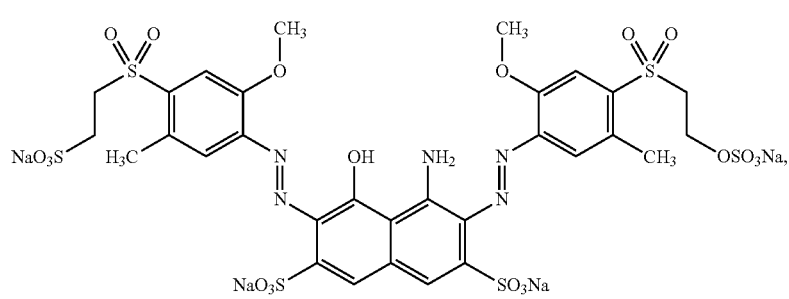
II-4
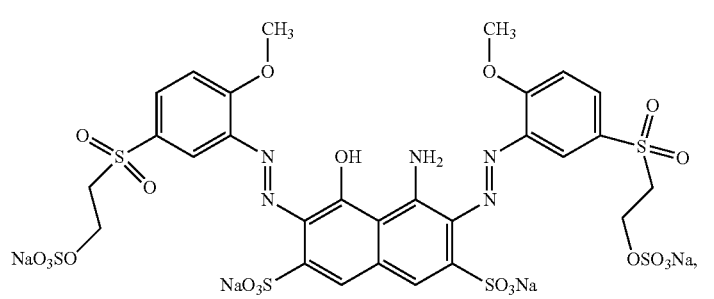
II-5
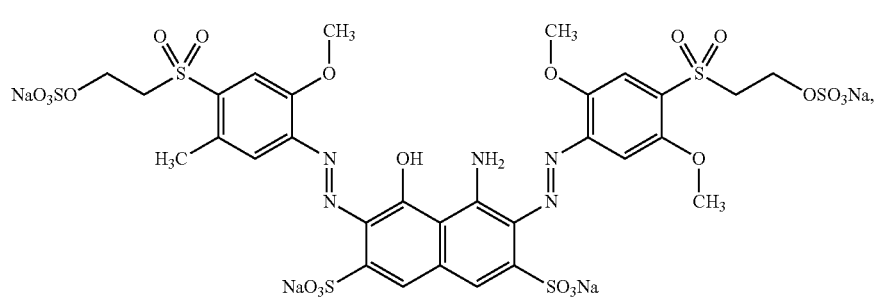

-continued
II-6
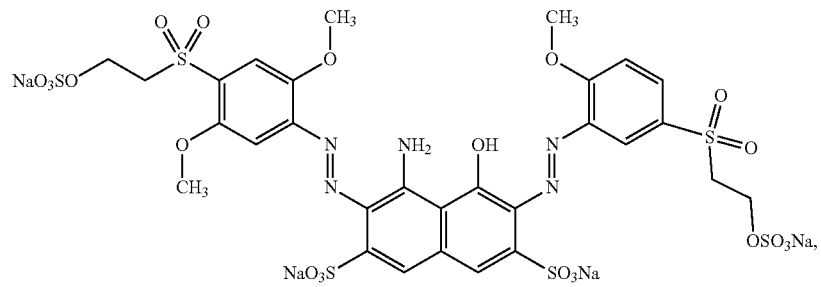
II-7
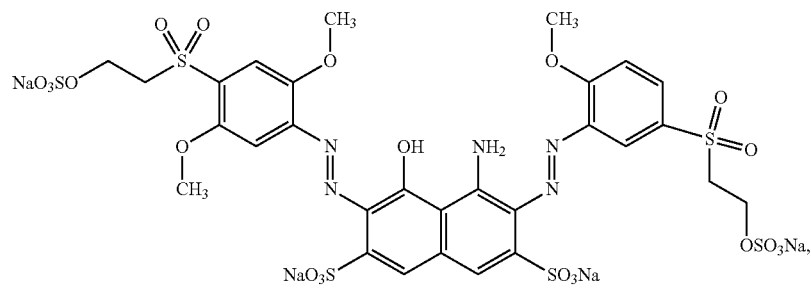
II-8 II-9
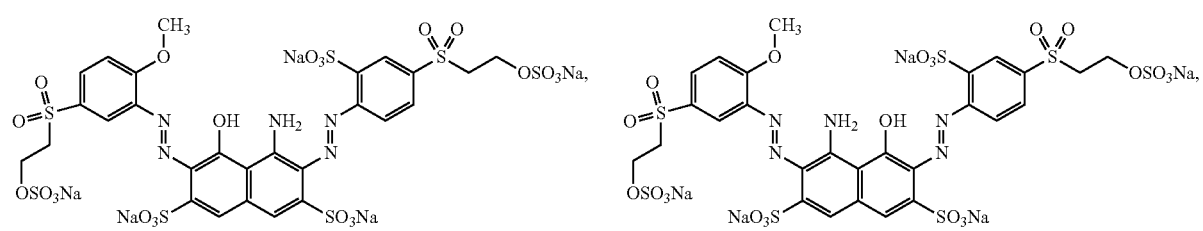
II-10
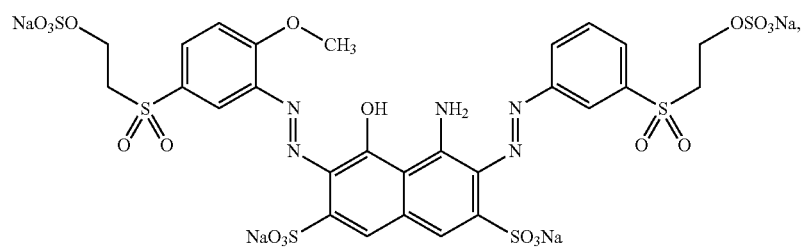
II-11
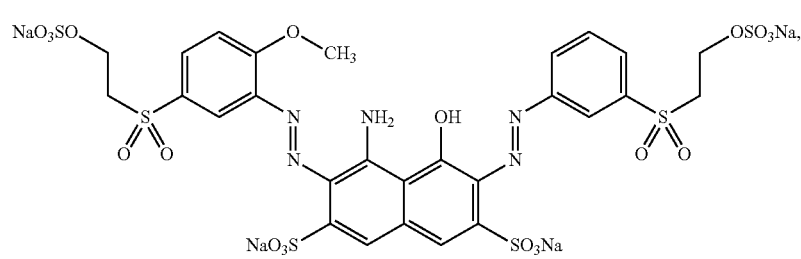
II-12
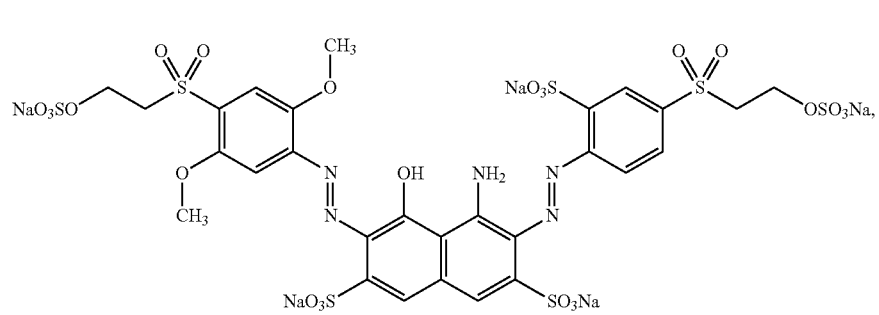

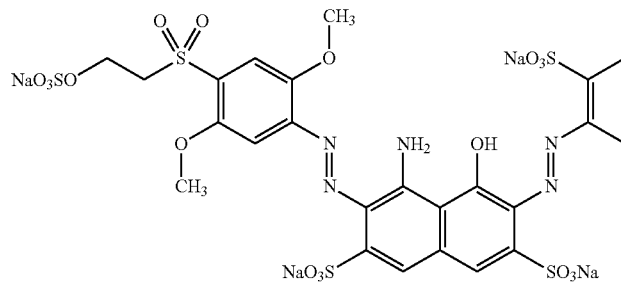

II-13 and

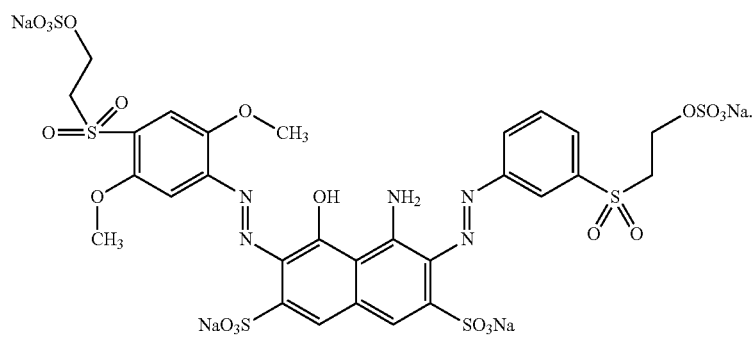

II-14

Even more preferred are mixtures, wherein the dye of general structure (II) is selected from the group consisting of: II-1, II-2, II-3, II-4, II-5, II-6, II-7, II-8, II-10, II-11, II-12 and II-13.

Most preferred are mixtures, wherein the dye of general structure (II) is selected from the group consisting of: II-1, II-2, II-6, II-7, II-12 and II-13.

Another particularly preferred group of mixtures according to the present invention are those, wherein a dye of general structure (III) is present and said dye is selected from the group consisting of:

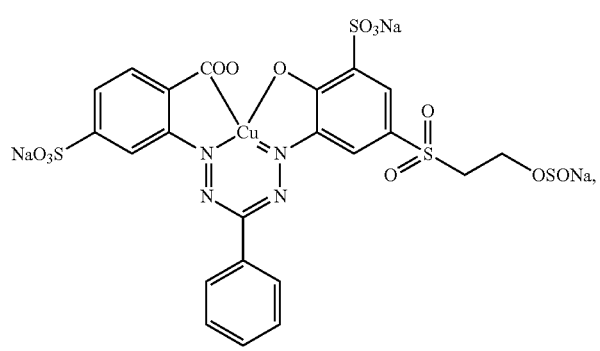

III-1

-continued
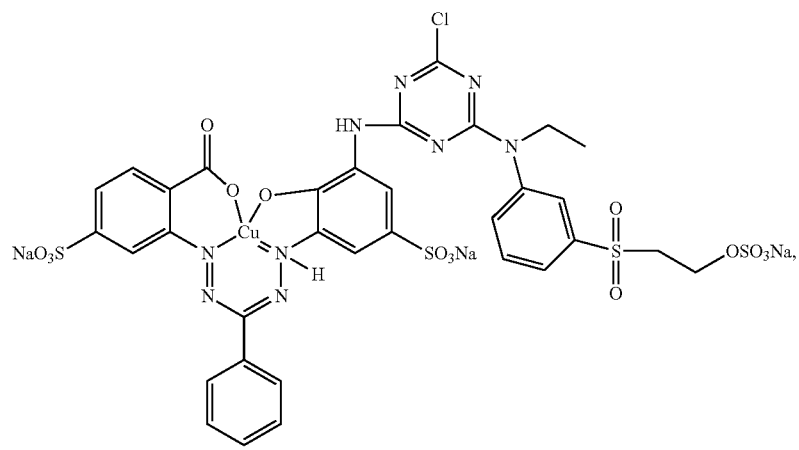
III-2
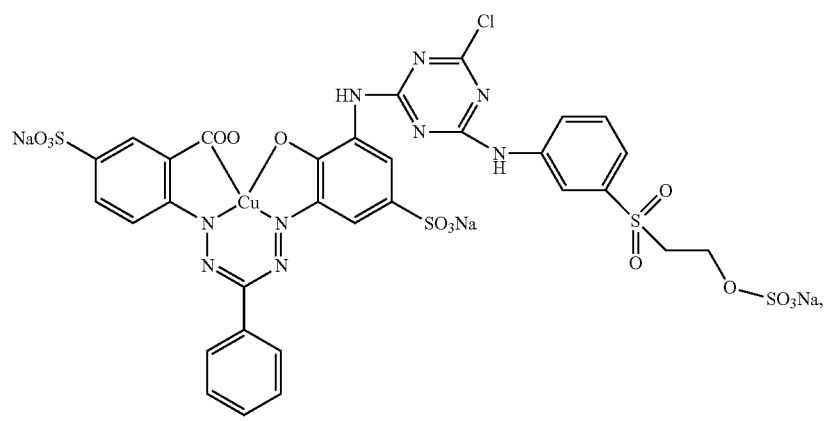
III-3
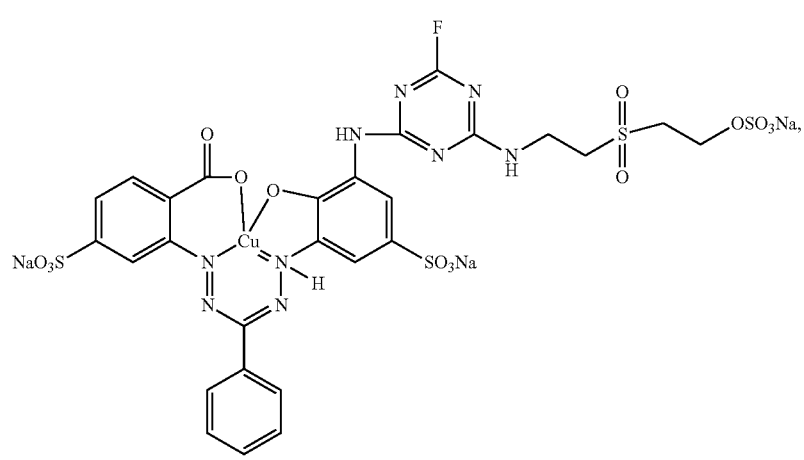
III-4

III-5
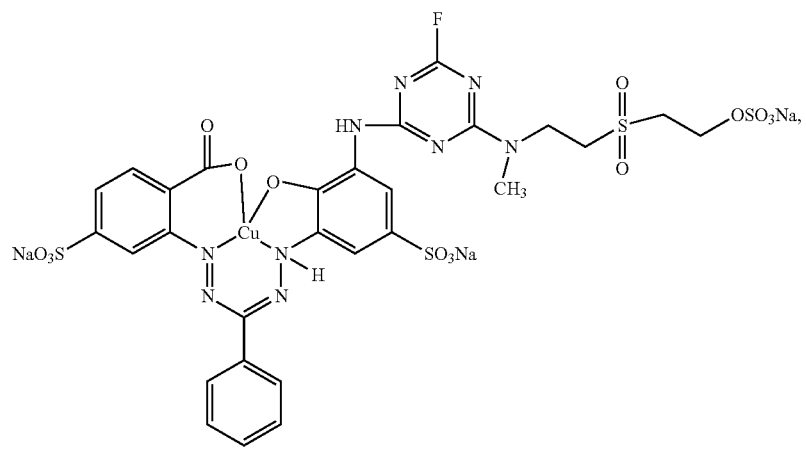
III-6
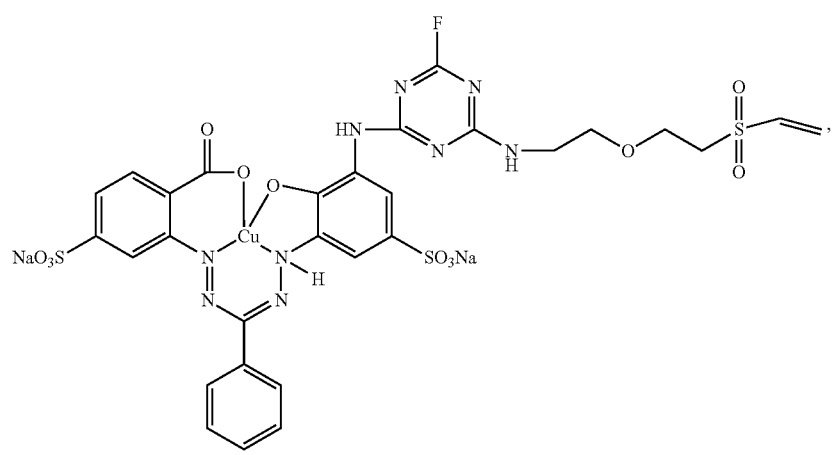
III-7
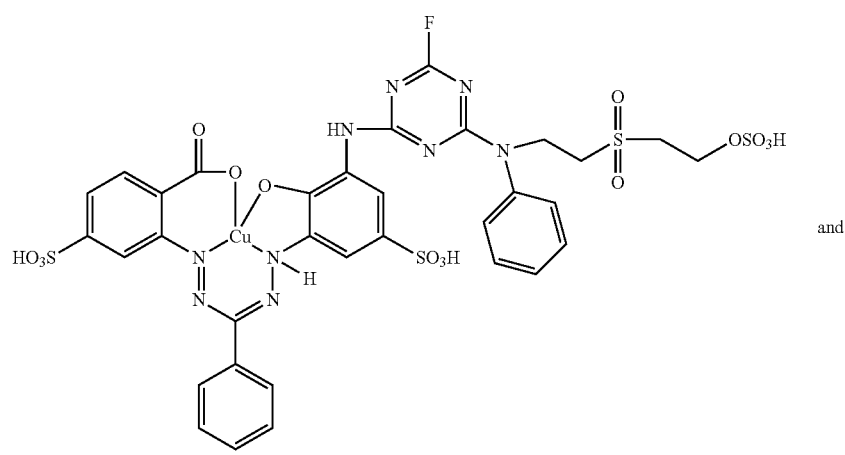
and

-continued

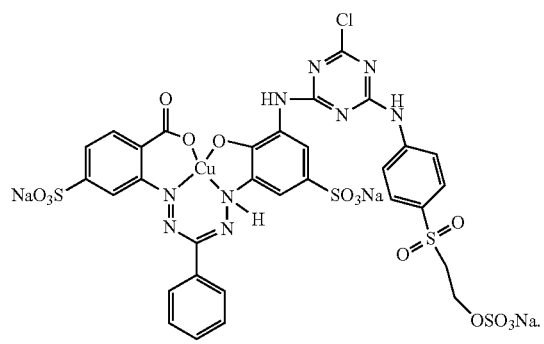

III-8

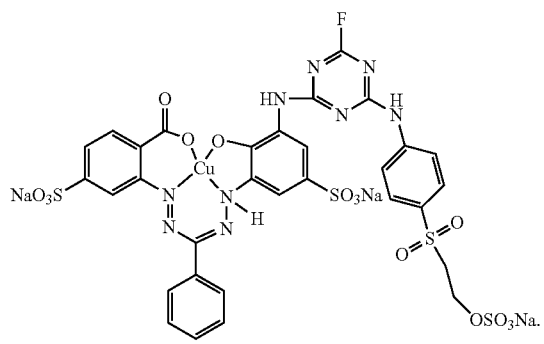

III-9

Even more preferred are mixtures, wherein the dye of general structure (III) is selected from the group consisting of: III-1, III-2, III-4, III-6, III-7 and III-8.

Most preferred are mixtures, wherein the dye of general structure (III) is selected from the group consisting of: III-1, III-2, III-6, III-7 and III-8.

A preferred group of mixtures according to the present invention are those mixtures, wherein both dyes (I) and (II) are specifically selected—with the dye of the formula (I) being selected from the list consisting of I-1, I-2, I-3, I-4, I-5, I-6, I-12, I-13, I-17, I-18, I-20 and I-21 and the dye of formula (II) being selected from the list consisting of II-1, II-2, II-3, II-4, II-5, II-6, II-7, II-8, II-10, II-11, II-12 and II-13. Even more preferred is the group of mixtures wherein both dyes (I) and (II) are specifically selected—with the dye of the formula (I) being selected from the list consisting of I-1, I-2 and I-4 and the dye of formula (II) being selected from the list consisting of II-1, II-2, II-6, II-7, II-12 and II-13.

From those mixtures wherein also a dye of structure (III) is present those are preferred, wherein both dyes (I) and (III) are specifically selected—with the dye of the formula (I) being selected from the list consisting of I-1, I-2, I-3, I-4, I-5, I-6, I-12, I-13, I-17, I-18, I-20 and I-21 and the dye of formula (III) being selected from the list consisting of III-1, III-2, III-4, III-6, III-7 and III-8. More preferred are those, wherein both dyes (I) and (III) are specifically selected—with the dye of the formula (I) being selected from the list consisting of I-1, I-2 and I-4 and the dye of formula (III) being selected from the list consisting of III-1, III-2, III-6, III-7 and III-8.

Another preferred subgroup wherein also a dye of structure (III) is present are those mixtures, wherein both dyes (II) and (III) are specifically selected—with the dye of the formula (II) being selected from the list consisting of II-1, II-2, II-3, II-4, II-5, II-6, II-7, II-8, II-10, II-11, II-12 and II-13 and the dye of formula (III) being selected from the list consisting of III-1, III-2, III-4, III-6, III-7 and III-8. A more preferred subgroup wherein also a dye of structure (III) is present are those mixtures, wherein both dyes (II) and (III) are specifically selected—with the dye of the formula (II) being selected from the list consisting of II-1, II-2, II-6, II-7, II-12 and II-13 and the dye of formula (III) being selected from the list consisting of III-1, III-2, III-6, III-7 and III-8.

The most preferred subgroup of such mixtures are those wherein all three dyes of structures (I), (II) and (III) are selected from the lists consisting of I-1, I-2, I-3, I-4, I-5, I-6, I-12, I-13, I-17, I-18, I-20 and I-21 for the dye of structure (I), of II-1, II-2, II-3, II-4, II-5, II-6, II-7, II-8, II-10, II-11, II-12 and II-13 for the dye of structure (II) and of III-1, III-2, III-4, III-6, III-7 and III-8 for the dye of formula (III). Within this group mixtures wherein all three dyes of structures (I), (II) and (Ill) are selected from the lists consisting of I-1, I-2 and I-4 for the dye of structure (I), of II-1, II-2, II-6, II-7, II-12 and II-13 for the dye of structure (II) and of III-1, III-2, III-6, III-7 and III-8 for the dye of formula (III) are the most preferred.

The dyes of formula (I), (II) and/or (III) and also the dye mixture according to the present invention may be present as a preparation in solid or in liquid (dissolved) form. In solid form they comprise, to the extent necessary, the electrolyte salts, which are customary for water-soluble and, in particular, fiber-reactive dyes, such as sodium chloride, potassium chloride, and sodium sulfate, and may further comprise the auxiliaries that are customary in commercial dyes, such as buffer substances capable of setting a pH of between 3 and 7 in aqueous solution, such as sodium acetate, sodium citrate, sodium borate, sodium hydrogencarbonate, sodium dihydrogenphosphate, and disodium hydrogenphosphate, and additionally dyeing auxiliaries, antidust agents, and small amounts of siccatives. If they are present in liquid, aqueous solution (including the content of thickeners of the kind customary for print pastes), they may also comprise substances which ensure a long life for these preparations, such as mold preventatives, for example.

In solid form, the dyes of the formula (I), (II) and/or (III) and also the dye mixture according to the invention are typically in the form of powders or granules which contain electrolyte salts (referred to generally, below, as preparations) with, where appropriate, one or more of the above-mentioned auxiliaries. In the preparations the dyes are present at 20% to 90% by weight, based on the preparation. The buffer substances are generally present in a total amount of up to 5% by weight, based on the preparation.

Where the dyes of the formula (I), (II) and/or (III) as well as the dye mixture according to the invention are present in aqueous solution, the total dye content of these aqueous solutions is up to about 50% by weight, such as, for example, between 5% and 50% by weight, the electrolyte salt content of these aqueous solutions being preferably below 10% by weight, based on the aqueous solution; the aqueous solutions (liquid preparations) may contain the aforementioned buffer substances in general in an amount of up to 5% by weight, preferably up to 2% by weight.

The dyes of formula (I), (II) and (III) can be isolated in conventional manner by being salted out, using common salt or potassium chloride, for example, or by spray drying or evaporation. An alternative option is to put the as-synthesized solutions, where necessary following addition of a buffer substance and if desired after concentration, to dyeing use directly, in the form of liquid preparations.

The mixtures of dyes of formula (I), (II) and (III) according to the present invention possess valuable performance properties and can be used for dyeing and printing carboxamido- and/or hydroxyl-containing materials. The stated materials may take the form, for example, of sheet-like structures such as paper and leather, the form of films, such as polyamide films, for example, or the form of a bulk composition, as of polyamide or polyurethane, for example. More particularly, however, they take the form of fibers of the stated materials.

The mixtures of the dyes of formula (I), (II) and optionally (III) according to the invention are used for dyeing and printing cellulosic fiber materials of all kinds. They are preferably also suitable for dyeing or printing polyamide fibers or blend fabrics of polyamide with cotton or with polyester fibers.

It is also possible to use the dye mixture of dyes having formula (I), (II) and optionally (III) according to the invention to print textiles or paper by the inkjet process.

The use of the mixtures of formula (I), (II) and optionally (III) as described above for dyeing or printing carboxamido- and/or hydroxyl-containing materials forms another aspect of the present invention, and processes for dyeing or printing carboxamido- and/or hydroxyl-containing materials in conventional procedures, by using one or more dyes of the general formula (I) according to the invention as colourants forms yet another aspect of the present invention.

Fibers or fiber materials for the purposes of the present invention are more particularly textile fibers, which may be present as woven fabrics or as yarns or in the form of hanks or wound packages.

Carboxamido-containing materials are, for example, synthetic and natural polyamides and polyurethanes, more particularly in the form of fibers, examples being wool and other animal hairs, silk, leather, nylon-6,6, nylon-6, nylon-11, and nylon-4.

Hydroxyl-containing materials are those of natural or synthetic origin, such as, for example, cellulose fiber materials or their regenerated products and polyvinyl alcohols. Cellulose fiber materials are preferably cotton, but also other plant fibers, such as linen, hemp, jute, and ramie fibers. Regenerated cellulose fibers are, for example, staple viscose and filament viscose.

The mixtures according to the present invention can be applied to and fixed on the stated materials, more particularly the stated fiber materials, by the application techniques that are known for water-soluble dyes, and particularly for fiber-reactive dyes.

Wool, which has been given a non-felting or low-felting finish (cf., for example, H. Rath, Lehrbuch der Textilchemie, Springer-Verlag, 3rd edition (1972), pp. 295-299, especially wool finished by the Hercosett process (p. 298); J. Soc. Dyers and Colourists 1972, 93-99, and 1975, 33-44) can be dyed with very good fastness properties. The process of dyeing on wool takes place in a conventional dyeing procedure from an acidic medium. For example, acetic acid and/or ammonium sulfate or acetic acid and ammonium acetate or sodium acetate can be added to the dyebath in order to obtain the desired pH. To achieve a useful levelness in the dyeing, it is advisable to add customary levelling assistants, such as, for example, a levelling assistant based on a reaction product of cyanuric chloride with three times the molar amount of aminobenzenesulfonic acid and/or of an aminonaphthalenesulfonic acid, or one based on a reaction product of, for example, stearylamine with ethylene oxide.

Thus, for example, the dye mixture of the invention is preferably first subjected to the exhaust process from an acidic dyebath having a pH of about 3.5 to 5.5, with monitoring of the pH, and then, toward the end of the dyeing time, the pH is shifted into the neutral and optionally weakly alkaline range, to a pH of up to 8.5, in order, in particular, to induce the full reactive binding between the dyes of the dye mixtures of the invention and the fiber, in order to obtain high depths of colour. At the same time the fraction of dye which has not been reactively bound is removed.

The procedure described here also applies to the production of dyeings on fiber materials composed of other natural polyamides or of synthetic polyamides and polyurethanes. These materials can be dyed using the customary dyeing and printing processes that are described in the literature and known to the person skilled in the art (see, for example, H.-K. Rouette, Handbuch der Textilveredlung, Deutscher Fachverlag GmbH, Frankfurt am Main).

Besides mixtures of the general formula (I), (II), optionally (III) and water, the dyeing liquors and print pastes may comprise further additives. Additives are, for example, wetting agents, antifoams, levelling agents, and agents that influence the properties of the textile material, such as softeners, flame retardant finish additives, and agents, which impart dirt, water, and oil repellency or that soften water. Print pastes in particular may also comprise natural or synthetic thickeners, such as alginates and cellulose ethers, for example. In the dyebaths and print pastes, the amounts of dye may vary within wide limits, in accordance with the desired depth of colour. Generally speaking, the a dye mixture of the formula (I), (II) and optionally (III) is present in amounts of 0.01% to 15% by weight, more particularly in amounts of 0.1% to 10% by weight, based on the dyeing goods or the print paste, respectively.

On cellulose fibers, dyeings having very good colour yields are obtained by the exhaust processes from a long liquor, using a wide variety of acid-binding agents and, where appropriate, neutral salts, such as sodium chloride or sodium sulfate. In the case of the exhaust process, it is preferred to carry out dyeing at a pH of 3 to 7, more particularly at a pH of 4 to 6. The liquor ratio may be selected within a wide range and is for example between 3:1 and 50:1, preferably between 5:1 and 30:1. Dyeing is done preferably in an aqueous bath at temperatures between 40 and 105° C., optionally at a temperature up to 130° C. under superatmospheric pressure, and where appropriate in the presence of customary dyeing auxiliaries. The wet fastness properties of the dyed material can be enhanced by an aftertreatment to remove unfixed dye. This aftertreatment takes place more particularly at a pH of 8 to 9 and at temperatures of 75 to 80° C.

One possible exhaust process procedure is to introduce the material into the warm bath and to gradually heat the bath to the desired temperature and complete the dyeing operation. The neutral salts, which accelerate the exhaustion of the dyes can also, if desired, not be added to the bath until the actual dyeing temperature has been reached.

The padding process on cellulose fibers likewise produces excellent colour yields and a very good colour buildup, with fixing able to take place in conventional manner by batching at room temperature or elevated temperature, at up to about 60° C., for example, by steaming or by means of dry heat.

The customary printing processes for cellulose fibers as well, which can be carried out in one step—as for example by printing with a print paste comprising sodium bicarbonate or another acid-binding agent and by subsequent steaming at 100 to 103° C.—or in two steps—as for example by printing with a neutral or weakly acidic printing ink, followed by fixing either by passage of the printed materials through a hot, electrolyte-containing alkaline bath or by overpadding with an alkaline, electrolyte-containing padding liquor, and subsequent batching or steaming or dry heat treatment of the alkali-overpadded material—produces strongly coloured prints with well-defined contours and a clear white ground. The outcome of the prints is affected little, if at all, by variations in the fixing conditions.

In the case of fixing by means of dry heat, in accordance with the customary thermofix processes, hot air at 120 to 200° C. is used. Besides the customary steam at 101 to 103° C., it is also possible to use superheated steam and high-pressure steam at temperatures of up to 160° C.

The acid-binding agents which effect the fixation of the dyes on the cellulose fibers are, for example, water-soluble basic salts of the alkali metals and likewise alkaline earth metals of organic or inorganic acids or compounds which liberate alkali in the heat. Particularly included are the alkali metal hydroxides and alkali metal salts of weak to moderately strong organic or inorganic acids, the preferred alkali metal compounds being the sodium compounds and potassium compounds. Examples of such acid-binding agents include sodium hydroxide, potassium hydroxide, sodium carbonate, sodium bicarbonate, potassium carbonate, sodium formate, sodium dihydrogenphosphate, disodium hydrogenphosphate, sodium trichloro-acetate, waterglass or trisodium phosphate, or mixtures thereof.

The mixtures of the general formula (I), (II) and optionally (III) according the invention are notable in particular for high colour strengths and fixing yields and ease of wash-off of the portions not fixed on the fiber. Moreover, the dyeings and prints have good all-round fastness properties, such as high light fastness and very good wet fastnesses, such as fastness to washing, to water, to salt water, to cross-dyeing, and to perspiration, for example, and also good fastness to pleating, hot pressing, and rubbing. They exhibit, furthermore, little tendency to stain polyamide in cotton/polyamide blend fabrics. All in all, therefore, they have an improved profile of properties relative to the dyes known from JP 47 036 838.

The present invention also provides inks for digital textile printing by the inkjet process, which comprise a dye mixture of the formula (I), (II) and optionally (III) according to the invention.

The inks of the invention comprise a dye mixture of the formula (I), (II) and optionally (III) according to the invention, in amounts, for example, of 0.1% to 50% by weight, preferably in amounts of 1% to 30% by weight, and more preferably in amounts of 1% to 15% by weight, based on the total weight of the ink. It will be appreciated that the inks may also comprise mixtures of dyes of the general formula (I) according to the invention and other dyes used in textile printing.

For the use of the inks in the continuous flow process, a conductivity of 0.5 to 25 mS/m can be set by addition of electrolyte. Examples of suitable electrolyte include lithium nitrate and potassium nitrate.

The inks of the invention may contain organic solvents with a total content of 1 to 50%, preferably of 5 to 30% by weight.

Examples of suitable organic solvents include alcohols, such as methanol, ethanol, 1-propanol, isopropanol, 1-butanol, tert-butanol, pentyl alcohol, polyhydric alcohols, such as 1,2-ethanediol, 1,2,3-propanetriol, butanediol, 1,3-butanediol, 1,4-butanediol, 1,2-propanediol, 1,3-propanediol, pentanediol, 1,4-pentanediol, 1,5-pentanediol, hexanediol, D,L-1,2-hexanediol, 1,6-hexanediol, 1,2,6-hexanetriol, 1,2-octanediol, polyalkylene glycols, such as polyethylene glycol, polypropylene glycol, alkylene glycols having 2 to 8 alkylene groups, e.g.: monoethylene glycol, diethylene glycol, triethylene glycol, tetraethylene glycol, thioglycol, thiodiglycol, butyltriglycol, hexylene glycol, propylene glycol, dipropylene glycol, tripropylene glycol, lower alkyl ethers of polyhydric alcohols, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol monohexyl ether, triethylene glycol monomethyl ether, triethylene glycol monobutyl ether, tripropylene glycol monomethyl ether, tetraethylene glycol monomethyl ether, tetraethylene glycol monobutyl ether, tetraethylene glycol dimethyl ether, propylene glycol monomethyl ether, propylene glycol monoethyl ether, propylene glycol monobutyl ether, tripropylene glycol isopropyl ether, polyalkylene glycol ethers, such as polyethylene glycol monomethyl ether, polypropylene glycol glycerol ether, polyethylene glycol tridecyl ether, and polyethylene glycol nonylphenyl ether, amines, such as methylamine, ethylamine, diethylamine, triethylamine, diethylamine, dimethylamine, trimethylamine, dibutylamine, diethanolamine, triethanolamine, ethylenediamine, urea derivatives, such as urea, thiourea, N-methylurea, N,N'-dimethylurea, ethyleneurea, and 1,1,3,3-tetramethylurea, amides, such as dimethylformamide, dimethylacetamide, acetamide, N-formylethanolamine, N-acetylethanolamine, ketones or keto alcohols, such as acetone, diacetone alcohol, cyclic ethers, such as tetrahydrofuran, dioxane, and also trimethylolethane, trimethylolpropane, 2-butoxyethanol, benzyl alcohol, gamma-butyrolactone, epsilon-caprolactam, and additionally sulfolane, methylsulfolane, 2,4-dimethylsulfolane, dimethyl sulfone, butadiene sulfone, dimethyl sulfoxide, dibutyl sulfoxide, N-cyclohexylpyrrolidone, N-methyl-2-pyrrolidone, N-ethylpyrrolidone, 2-pyrrolidone, 1-(2-hydroxyethyl)-2-pyrrolidone, 1-(3-hydroxypropyl)-2-pyrrolidone, 1,3-dimethyl-2-imidazolidinone, 1,3-dimethyl-2-imidazolinone, 1,3-bismethoxy-methylimidazolidine, 2-(2-methoxyethoxy)ethanol, 2-(2-ethoxyethoxy)ethanol, 2-(2-butoxyethoxy) ethanol, 2-(2-propoxyethoxy)ethanol, 1,2-dimethoxypropane, trimethoxypropane, pyridine, piperidine, ethyl acetate, ethylenediaminetetraacetate, and ethyl pentyl ether.

The inks of the invention may further comprise the customary additives, such as, for example, viscosity moderators to set viscosities in the range from 1.5 to 40 mPas in a temperature range from 20 to 50° C. Preferred inks have a viscosity of 1.5 to 20 mPas, and particularly preferred inks have a viscosity of 1.5 to 15 mPas.

Suitable viscosity moderators are rheological additives, examples being the following: polyvinylcaprolactam, polyvinylpyrrolidone, and also their copolymers, polyetherpolyol, associative thickeners, polyurea, polyurethane, sodium alginates, modified galactomannans, polyetherurea, polyurethane, and nonionic cellulose ethers.

As further additives the inks of the invention may include surface-active substances for setting surface tensions of 20 to 65 mN/m, which are adapted if necessary as a function of the process used (thermo or piezoelectric technology).

Examples of suitable surface-active substances include the following: surfactants of all kinds, preferably nonionic surfactants, butyldiglycol, and 1,2-hexanediol.

The inks may further comprise customary additives, such as substances for inhibiting fungal and bacterial growth, for example, in amounts of 0.01% to 1% by weight, based on the total weight of the ink.

The inks of the invention may be prepared in conventional manner by mixing of the components in water.

The inks of the invention are suitable for use in inkjet printing processes for printing a very wide variety of pre-treated materials, such as silk, leather, wool, polyamide fibers and polyurethanes, and more particularly cellulosic fiber materials of all kinds. The printing inks of the invention are also suitable for printing pretreated hydroxyl- and/or amino-containing fibers that are present in blend fabrics; for example, mixtures of cotton, silk, wool with polyester fibers or polyamide fibers.

In contrast to conventional textile printing, where the printing ink already contains all of the fixing chemicals and thickeners for a reactive dye, it is necessary in the case of inkjet printing to apply the auxiliaries to the textile substrate in a separate pretreatment step.

The pretreatment of the textile substrate, such as, for example, cellulose fibers and regenerated cellulose fibers, and also silk and wool, takes place with an aqueous alkaline liquor prior to printing. Fixing reactive dyes requires alkali, for example sodium carbonate, sodium bicarbonate, sodium acetate, trisodium phosphate, sodium silicate, sodium hydroxide, alkali donors such as, for example, sodium chloroacetate, sodium formate, hydrotropic substances such as, for example, urea, reduction inhibitors, such as, for example, sodium nitrobenzenesulfonates, and also thickeners to prevent flowing of the motifs when the printing ink is applied, examples thereof being sodium alginates, modified polyacrylates or highly etherified galactomannans.

These pretreatment reagents are applied uniformly to the textile substrate in a defined amount, using suitable applicators, as for example with a 2- or 3-roll pad mangle, by contactless spraying technologies, by means of foam application, or with appropriately adapted inkjet technologies, and are subsequently dried.

After printing has taken place, the textile fiber material is dried at 120 to 150° C. and then fixed.

Fixing the inkjet prints produced with reactive dyes can be accomplished at room temperature, or with saturated steam, with superheated steam, with hot air, with microwaves, with infrared radiation, with laser beams or electron beams, or with other suitable energy transfer techniques.

A distinction is made between one- and two-phase fixing operations. In one-phase fixing, the chemicals needed for fixing are already on the textile substrate. In two-phase fixing, this pretreatment is unnecessary. Fixing requires only alkali, which, following inkjet printing, is applied prior to the fixing operation, without drying in between. Further additives such as urea or thickeners are redundant.

Following the fixing operation, the print is aftertreated, which is a prerequisite for good fastness properties, high brilliance, and an impeccable white ground.

The prints produced with the inks of the invention possess high colour strength and a high fiber-dye bond stability, not only in the acidic range but also in the alkaline range, and also have good light fastness and very good wet fastness properties, such as fastness to washing, water, salt water, cross-dyeing, and perspiration, and also good fastness to pleating, hot pressing, and rubbing.

The a dye mixture of the formula (I), (II) and optionally (Ill) according to the invention furnish blue/navy blue dyeings and prints, and inkjet prints, on the materials specified.

The examples herein below serve to illustrate the invention. The parts are parts by weight and the percentages are percent by weight, unless noted otherwise. The relationship between parts by weight and parts by volume is that of the kilogram to the liter. The compounds described by formula in the examples are written in the form of the sodium salts, since in general they are prepared and isolated in the form of their salts, preferably sodium salts or potassium salts, and used for dyeing in the form of their salts. The starting compounds specified in the examples below, especially the tabular examples, can be used in the synthesis in the form of the free acid or likewise in the form of their salts, preferably alkali metal salts, such as sodium salts or potassium salts.

The dyes were synthesized as outlined in European patents EP 1 490 441 and WO 2010/050495. The dye mixtures were then prepared as in the following examples.

EXAMPLE 1

70 parts of an electrolyte-containing dye powder containing the reddish blue azo dye of the formula (I-1), and 30 parts of an electrolyte-containing dye powder containing the greenish navy azo dye of the formula (II-1), were mixed mechanically with one another.

The resultant dye mixture of the invention provides neutral navy dyeings and prints, on cotton for example, under the dyeing conditions customary for reactive dyes.

EXAMPLE 2

50 parts of an electrolyte-containing dye powder containing the reddish blue azo dye of the formula (I-1), 30 parts of an electrolyte-containing dye powder containing the greenish navy azo dye of the formula (II-1), and 20 parts of an electrolyte-containing dye powder containing the blue azo dye of the formula (III-7) were mixed mechanically with one another.

The resultant dye mixture of the invention provides neutral navy dyeings and prints, on cotton for example, under the dyeing conditions customary for reactive dyes.

EXAMPLE 3

50 parts of an electrolyte-containing dye powder containing the reddish blue azo dye of the formula (I-4), 30 parts of an electrolyte-containing dye powder containing the navy azo dye of the formula (II-6), and 20 parts of an electrolyte-containing dye powder containing the blue azo dye of the formula (III-1) were mixed mechanically with one another.

The resultant dye mixture of the invention provides neutral navy dyeings and prints, on cotton for example, under the dyeing conditions customary for reactive dyes.

| Example No | Component I | % | Component II | % | Component II | % |
|---|---|---|---|---|---|---|
| 4 | I.1 | 60 | II.1 | 40 | — | — |
| 5 | I.1 | 50 | II.1 | 50 | — | — |
| 6 | I.1 | 50 | II.1 | 30 | III.1 | 20 |
| 7 | I.1 | 20 | II.1 | 30 | III.1 | 50 |
| 8 | I.1 | 50 | II.1 | 30 | III.2 | 20 |
| 9 | I.1 | 50 | II.1 | 30 | III.3 | 20 |
| 10 | I.1 | 50 | II.1 | 30 | III.4 | 20 |
| 11 | I.1 | 50 | II.1 | 30 | III.5 | 20 |
| 12 | I.1 | 50 | II.1 | 30 | III.6 | 20 |
| 13 | I.2 | 70 | II.2 | 30 | — | — |
| 14 | I.2 | 60 | II.2 | 40 | — | — |
| 15 | I.2 | 50 | II.2 | 50 | — | — |

-continued

| Example No | Component I | % | Component II | % | Component II | % |
|---|---|---|---|---|---|---|
| 16 | I.2 | 50 | II.2 | 30 | III.1 | 20 |
| 17 | I.2 | 50 | II.2 | 30 | III.7 | 20 |
| 18 | I.3 | 70 | II.1 | 30 | — | — |
| 19 | I.3 | 60 | II.1 | 40 | — | — |
| 20 | I.3 | 50 | II.1 | 50 | — | — |
| 21 | I.4 | 70 | II.1 | 30 | — | — |
| 22 | I.4 | 60 | II.1 | 40 | — | — |
| 23 | I.4 | 50 | II.1 | 50 | — | — |
| 24 | I.4 | 50 | II.1 | 30 | III.1 | 20 |
| 25 | I.4 | 50 | II.1 | 30 | III.7 | 20 |
| 26 | I.5 | 70 | II.1 | 30 | — | — |
| 27 | I.5 | 60 | II.1 | 40 | — | — |
| 28 | I.5 | 50 | II.1 | 50 | — | — |
| 29 | I.6 | 70 | II.1 | 30 | — | — |
| 30 | I.6 | 60 | II.1 | 40 | — | — |
| 31 | I.6 | 50 | II.1 | 50 | — | — |
| 32 | I.12 | 70 | II.1 | 30 | — | — |
| 33 | I.12 | 60 | II.1 | 40 | — | — |
| 34 | I.12 | 50 | II.1 | 50 | — | — |
| 35 | I.13 | 70 | II.1 | 30 | — | — |
| 36 | I.13 | 60 | II.1 | 40 | — | — |
| 37 | I.13 | 50 | II.1 | 50 | — | — |
| 38 | I.17 | 70 | II.1 | 30 | — | — |
| 39 | I.17 | 60 | II.1 | 40 | — | — |
| 40 | I.17 | 50 | II.1 | 50 | — | — |
| 41 | I.18 | 70 | II.1 | 30 | — | — |
| 42 | I.18 | 60 | II.1 | 40 | — | — |
| 43 | I.18 | 50 | II.1 | 50 | — | — |
| 44 | I.20 | 70 | II.1 | 30 | — | — |
| 45 | I.20 | 60 | II.1 | 40 | — | — |
| 46 | I.20 | 50 | II.1 | 50 | — | — |
| 47 | I.21 | 70 | II.1 | 30 | — | — |
| 48 | I.21 | 60 | II.1 | 40 | — | — |
| 49 | I.21 | 50 | II.1 | 50 | — | — |
| 50 | I.1 | 70 | II.4 | 30 | — | — |
| 51 | I.1 | 60 | II.4 | 40 | — | — |
| 52 | I.1 | 50 | II.4 | 50 | — | — |
| 53 | I.1 | 70 | II.5 | 30 | — | — |
| 54 | I.1 | 60 | II.5 | 40 | — | — |
| 55 | I.1 | 50 | II.5 | 50 | — | — |
| 56 | I.1 | 70 | II.6 | 30 | — | — |
| 57 | I.1 | 60 | II.6 | 40 | — | — |
| 58 | I.1 | 50 | II.6 | 50 | — | — |
| 59 | I.1 | 50 | II.6 | 30 | III.1 | 20 |
| 60 | I.1 | 50 | II.6 | 30 | III.7 | 20 |
| 61 | I.1 | 70 | II.8 | 30 | — | — |
| 62 | I.1 | 60 | II.8 | 40 | — | — |
| 63 | I.1 | 50 | II.8 | 50 | — | — |
| 64 | I.1 | 70 | II.10 | 30 | — | — |
| 65 | I.1 | 60 | II.10 | 40 | — | — |
| 66 | I.1 | 50 | II.10 | 50 | — | — |
| 67 | I.1 | 70 | II.11 | 30 | — | — |
| 68 | I.1 | 60 | II.11 | 40 | — | — |
| 69 | I.1 | 50 | II.11 | 50 | — | — |
| 70 | I.1 | 70 | II.12 | 30 | — | — |
| 71 | I.1 | 60 | II.12 | 40 | — | — |
| 72 | I.1 | 50 | II.12 | 50 | — | — |
| 73 | I.1 | 50 | II.12 | 30 | III.1 | 20 |
| 74 | I.1 | 50 | II.12 | 30 | III.7 | 20 |
| 75 | I.1 | 70 | II.13 | 30 | — | — |
| 76 | I.1 | 60 | II.13 | 40 | — | — |
| 77 | I.1 | 50 | II.13 | 50 | — | — |
| 78 | I.1 | 50 | II.13 | 30 | III.1 | 20 |
| 79 | I.1 | 50 | II.13 | 30 | III.7 | 20 |
| 80 | I.1 | 70 | II.14 | 30 | — | — |
| 81 | I.1 | 60 | II.14 | 40 | — | — |
| 82 | I.1 | 50 | II.14 | 50 | — | — |
| 83 | I.1 | 50 | II.14 | 30 | III.1 | 20 |
| 84 | I.1 | 50 | II.14 | 30 | III.7 | 20 |

APPLICATION EXAMPLE 1

5 parts of the dye obtained in example 1 and 50 parts of sodium chloride were dissolved in 999 parts of water, and 5 parts of sodium carbonate, 0.7 parts of sodium hydroxide (in the form of a 32.5% strength aqueous solution) and, if necessary, 1 part of a wetting agent are added. This dyebath was entered with 100 g of a woven cotton fabric. The temperature of the dyebath was maintained at 25° C. for 10 minutes to start with, then raised over 30 minutes to the final temperature 60° C. and held at that temperature for a further 60 to 90 minutes. Thereafter the dyed goods were rinsed first for 2 minutes with water and subsequently for 5 minutes with water. The dyed goods were neutralized at 40° C. in 1000 parts of an aqueous solution containing 1 part of 50% strength acetic acid for 10 minutes. This was followed by rinsing with deionized water at 70° C. and then by soaping off at the boil for 15 minutes with a laundry detergent, rinsing again, and drying. This gives a strongly colored navy dyeing having very good fastness properties.

The invention claimed is:

1. A mixture of fibre-reactive dyes consisting of:

a dye of formula (I-1), (II-1) and (III-7)

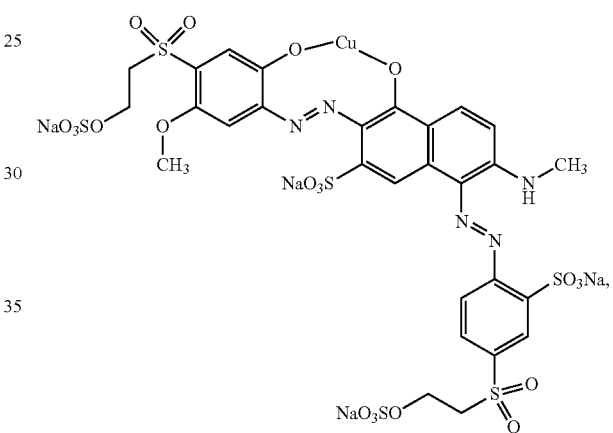

I-1

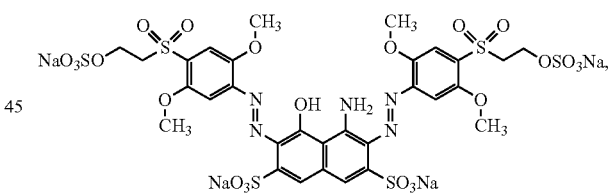

II-1

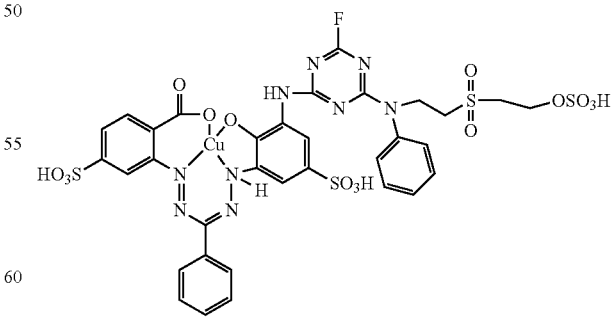

III-7 wherein the dye of formula (I-1), (II-1) and (III-7) is present in a weight ratio of (I-1) 50 to 60%, (II-1) 40 to 20% and (III-7) 30 to 20% with percentages adding up to 100%.

2. The mixture as claimed in claim 1, wherein the dye of formula (I-1), (II-1) and (III-7) is present in a weight ratio of (I-1) 50%, (II-1) 30% and (III-7) 20% with percentages adding up to 100%.

* * * * *